Inventors
Donald W. Collier
Joseph P. Hoppesch
Anthony C. Mamo
By Richard G. Kinney
Attorney 3,764,270
BREATH TESTING SYSTEM
Donald W. Collier, Chicago, Joseph P. Hoppesch, Streamwood, and Anthony C. Mamo, Arlington Heights, Ill., assignors to Borg-Warner Corporation, Chicago, Ill.
Filed Apr. 23, 1971, Ser. No. 136,778
Int. Cl. A61b 5/00, 10/00; G01n 33/16
U.S. Cl. 23—255 E                                    12 Claims

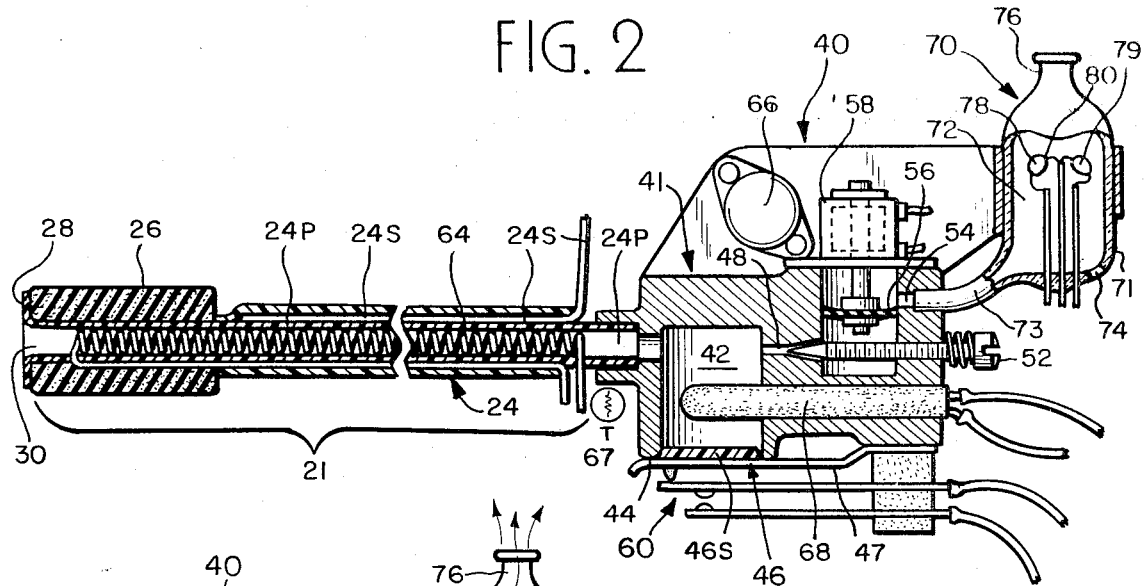
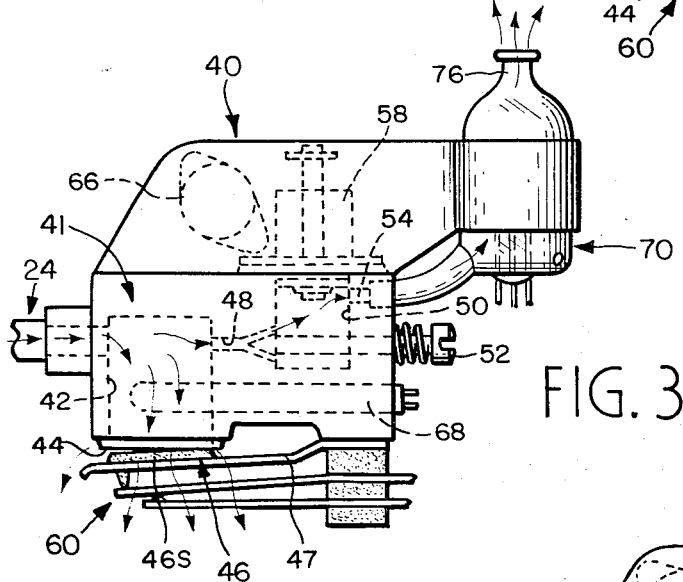
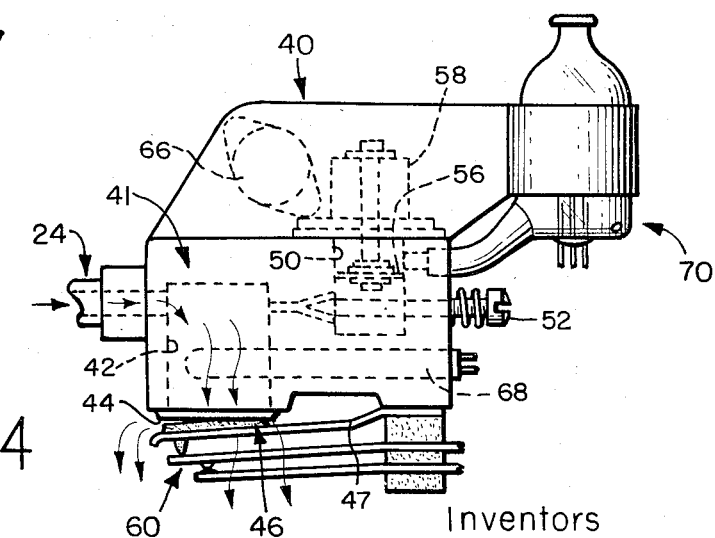

ABSTRACT OF THE DISCLOSURE

A gas sample testing system receives deep lung breath from a subject for determining alcohol concentration. A breath input unit delivers a sample of deep lung breath through a controller to an evaluator which includes an alcohol detector. The controller includes a breath pressure sensitive switch and a timer, to insure continuous breath flow for a predetermined period (e.g., 5 seconds) prior to testing. This arrangement secures a deep lung breath sample for testing. The detector has a Wheatstone bridge with a catalytic resistance leg for contact with the gas sample. The detector provides an information signal connoting alcohol concentration in the gas sample. This information signal is compared with a stored, previously taken, signal from the same detector to compensate the zero drift. The resultant output signal is displayed on a meter, or used to energize a simple pass-fail indicator.

CROSS-REFERENCE TO RELATED APPLICATION

The present application is related to copending U.S. patent application S.N. 136,921, which was filed on the same day as was the present application, in the names of the same inventors and with the same assignee.

BACKGROUND OF THE INVENTION

Alcoholic intoxication represents a major public health and safety problem in most countries in the world and especially in the United States of America. In this country the motor vehicle is the principal means of transportation and millions of Americans drive their cars on the public highways each day. "Alcohol and the Impaired Driver," a publication of the American Medical Association's Committee on Medicolegal Problems, reports that auto accident costs, in 1965 alone, exceeded eight billion dollars. In human terms, three and one-half million injuries were sustained in that year, and forty-nine thousand Americans were killed in auto accidents. Although the contribution of alcohol intoxication to this terrible toll cannot be precisely determined, there is general agreement that, despite stringent anti-drunk driving laws, alcohol intoxication is a factor in a major portion of these accidents.

As the population and number of vehicles increase, the problem of the drunk driver and the effect of his driving on innocent victims will intensify. By 1975 it is estimated that 225,000,000 Americans will be riding in 113,642,000 motor vehicles; 80% of both of these totals will be in the crowded metropolitan areas. Controlling drunk driving will, at that time, be imperative.

In many industrial plants the inebriated worker is a growing problem. Such a worker represents a danger not only to himself and his co-workers, but also to the equipment he handles and the community at large. This problem is magnified in plants involving the processing of toxic or explosive materials.

While various proposals and devices have been made in the past to deal with detection and control of the inebriate, in the driving area, in industrial areas, and other fields, these have suffered from several drawbacks. Chemical testing devices now commercially available tend to be expensive, inconvenient, difficult and sometimes dangerous for use by any but a well-trained technician. This militates against placement, for example, in police cars, or in emergency wards of hospitals. Most of these devices allow the subject to avoid an accurate test, except in the case of direct and alert supervision. For example, breath tests to be accurate require a sample of deep lung breath. Such breath tests can be evaded by inhaling and exhaling repetitively so as to test only oral or mixed breath.

SUMMARY OF THE INVENTION

The present invention answers the growing problem of personal and property damage by an inebriate person, by providing a relatively simply operated, accurate and economic breath tester that directly measures deep lung breath alcohol concentration without the necessity of close supervision of the subject. A breath testing apparatus constructed in accordance with the present invention includes a breath input unit, and means for sensing the flow of gas through the breath input unit. The term "gas," as used herein and in the appended claims, embraces both ordinary air in the atmosphere, and breath exhaled from the lungs of a human subject. An evaluator is connected to receive a sample of gas flowing through the input unit, for evaluating the alcohol concentration in the received gas sample, and for producing an output signal in response to the detected alcohol concentration. An output apparatus is connected for operation in response to receipt of the output signal from the evaluator.

In accordance with an important aspect of the invention, means is provided and connected to operate in response to the flow sensing means, for insuring that the output apparatus is activated in response to the evaluator output signal indicating the tested gas sample is from deep lung breath. To provide such a deep lung sample the invention requires an essentially continuous and uninterrupted flow of breath over a threshold level for a predetermined period of time of a duration to insure that the gas sample obtained is deep lung breath.

These and additional features of the present invention which are believed to be novel are detailed in the following description and are set forth with particularity in the appended claims. The invention itself, together with further advantages and features thereof, may be understood by reference to the following description taken in connection with the accompanying drawings, in the several figures of which like reference numerals identify like elements.

BRIEF DESCRIPTION OF THE DRAWINGS

FIG. 2 is a side view, partly in section and partly broken away, of portions of the system shown more generally in FIG. 1;

FIGS. 3 and 4 are side views of a portion of the apparatus depicted in FIG. 2, with interior parts shown in phantom lines and arrows illustrating gas flow paths, and showing component movements at different stages in the system operation of the controller.

GENERAL SYSTEM DESCRIPTION

Figure 1:
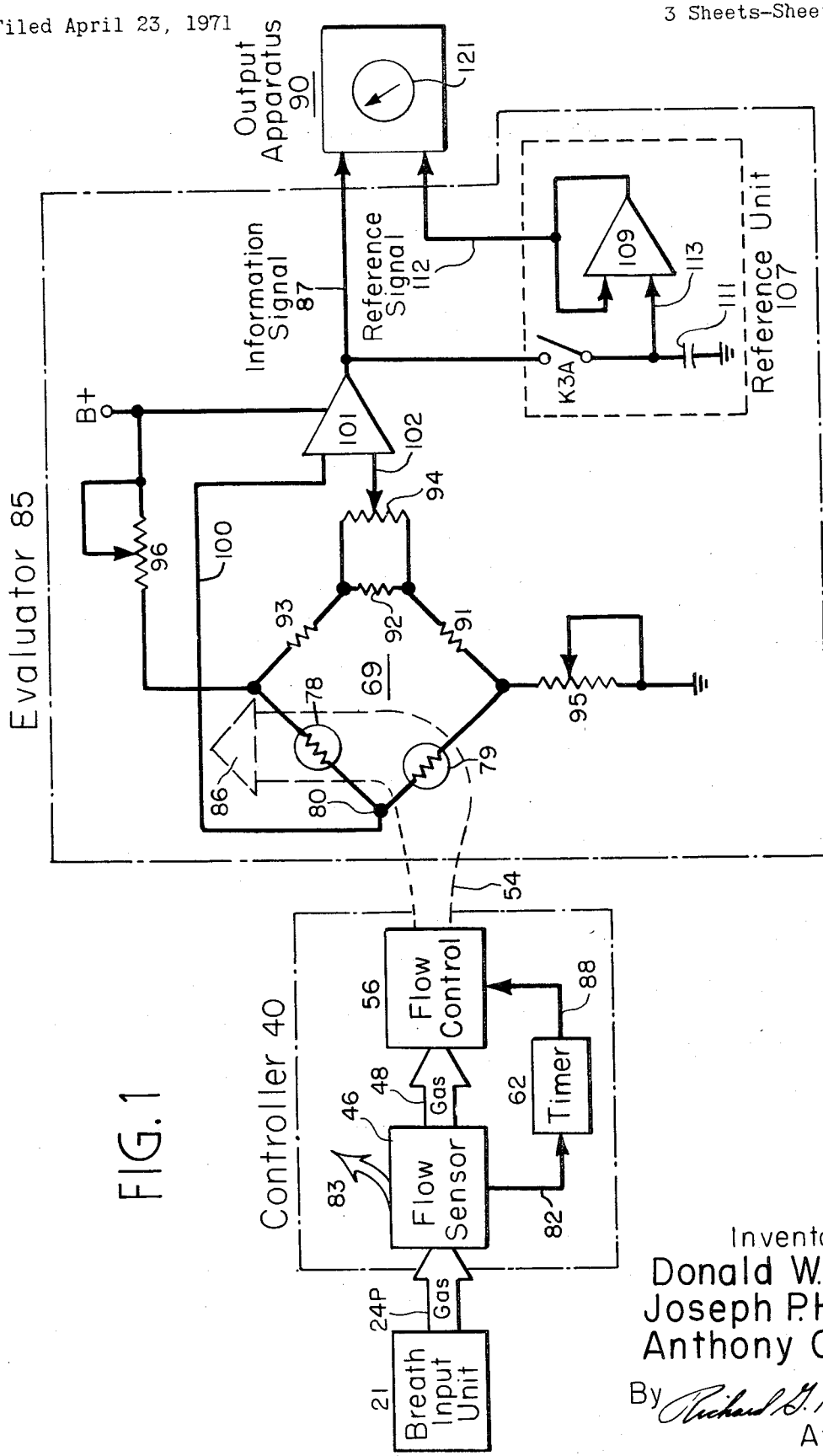
FIG. 1 is a system diagram, partly in block form and partly schematic, of an apparatus constructed in accordance with the teachings of the present invention.

FIG. 1 depicts the system arrangement of an apparatus for implementing this invention. As there shown a breath input unit 21 is provided to direct a gas flow through a channel 24P to a controller 40. As will become apparent channel 24P is not an element separate from the input unit and the controller, but it is convenient to designate the transition of the gas sample with this reference. The term "gas," as used in this description and in the appended claims, includes fluids other than liquids. Thus the term embraces both atmospheric air, and breath which has been exhaled or expired from a human being.

Controller 40 receives gas, or a gas sample, in a flow sensor 46. A portion of this gas is vented to the atmosphere, as represented by the arrow 83. When such venting starts, timer 62 is set, or has a predetermined time period initiated, by a signal receiver over line 82 from flow sensor 46. Termination of gas delivery to the flow sensor applies a reset or stop signal over line 82 when sensor 46 recognizes the gas flow has fallen below a threshold level.

Gas passes from flow sensor 46 through another channel 48 and through a flow control stage 56. This stage may include a valve, seated within a chamber and operated by a solenoid in response to a control signal received over line 88 from the timer. Stage 56 allows gas to pass through another channel 54 to a bridge circuit 69 within the alcohol detector, which is in the evaluator stage 85. The physical structure of the alcohol detector will be described hereinafter in connection with FIGS. 2–4.

In its operation the bridge circuit 69 provides an information signal between conductors 100, 102 which signifies the alcohol concentration in the sample of gas, whether breath or air, just tested. This information signal passes through amplifier 101 and is applied over conductor 87 to one input connection of an output apparatus 90. This apparatus may include a meter 121 for indicating the exact amplitude of the information signal on conductor 87, as referred to the level of a reference signal present on conductor 112. This reference signal is derived from the output connection of an amplifier 109 in reference unit 107.

Reference unit 107 includes a signal storage means 111, shown as a capacitor. Closure of contact set K3A completes a charging circuit for capacitor 111, between conductor 87 and ground. The system is cycled, as will be detailed hereinafter, a short period prior to testing a gas sample from the breath input unit. At this time only atmospheric air is present in the detector. In this initial cycling the signal produced between lines 100, 102 and passed through amplifier 101 to line 87 is a first signal, developed to indicate the alcohol concentration in the air initially present in the detector. Contact set K3A is closed, either manually or automatically, to store the first signal in capacitor 111 as it charges to the voltage applied between conductor 87 and ground. This first signal serves as a reference signal, which is amplified in stage 109 and passed over line 112 to the reference signal input of output apparatus 90. Thus unit 90 can display the difference between this reference signal, indicating the alcoholic concentration (zero) of air initially present in the detector, and the information signal, representing the alcoholic concentration in a breath sample provided by a subject by blowing into breath input unit 21.

DETAILED DESCRIPTION OF THE INVENTION

Referring to FIG. 2, there is depicted breath input unit 21, controller 40, and alcohol detector 70. The breath input unit 21 includes a tube structure 24, which has a cylindrically shaped end piece or handle 26. At the extreme end of handle 26 is a disc shaped cap 28 in which a breath input opening 30 is formed. The opening 30 is part of a gas channel extending through passageway 24P in handle 26 and tube 24, to controller 40.

The body of the handle 26 is preferably formed of resilient compressible material, such as foam or sponge rubber, and is relatively impervious to gas flow. By closing the fist about the handle and compressing the material, a good seal is formed between the hand and the handle. When used in this manner, a subject may blow into his cupped hand and into input unit 21 in a sanitary manner without having his lips touch input unit 21. A spring metal wire or hairpin spring 24S is affixed along tube 24 to provide the resiliency. While the tube structure 24 is preferably made of a flexible material so as to bend, the tube is sufficiently rigid to prevent it from being closed off by a hand gripping the handle portion 26. Although the depicted input unit 21 is preferred, any equivalent input unit may be employed without departing from the principles of the present invention.

The particular breath input unit 21 of FIG. 2 is the subject of the following copending U.S. patent applications: Ser. No. D. 187,723, entitled, "Breath Input Unit for a Breath Tester," filed Oct. 8, 1971, in the names of Samuel Shiber and Joseph P. Hoppesch; Ser. No. 187,724, entitled, "Breath Input Unit for Vehicle Breath Testing System," filed Oct. 8, 1971, in the names of Samuel Shiber and Joseph P. Hoppesch; and Ser. No. 197,408, entitled, "Breath Input Hand Unit for Breath Tester," filed Nov. 10, 1971, in the names of Joseph P. Hoppesch and Anthony C. Mamo. All of these are assigned to the same assignee as is the present application.

Breath exhaled or blown into input unit 21 passes from the opening 30 into controller 40 via passageway 24P in the tube structure 24. The controller 40 has a main body 41 defining a chamber 42 into which the tube 24 channels the gas flow. The chamber 42 has a first exit port 44, which is closed by a flapper valve 46. The valve 46 has a stopper 46S which is mechanically biased toward exit port 44 by a leaf spring 47. This port or vent 44 is open to the atmosphere, and serves to dump or vent gas from chamber 42 when the flapper valve 46 is open. Chamber 42 and exit port 44, provided at its bottom, also serve to effectively remove and drain gas-flow-carried water and saliva from the subject's breath and prevent that moisture from interfering with the detector 70.

A second exit from chamber 42 is provided by the orifice 48 which opens into a second chamber 50. An adjustment screw 52 provides a measure of regulation for the gas flow from the orifice 48 into chamber 50. The chamber 50 is closed except for a port 54 (FIG. 3) which is opened and closed by means of a valve 56 driven by a solenoid 58.

The flapper valve 46 functions to spill or vent at least the greater part of the air or breath entering chamber 42. In so doing the breath pressure maintains the valve 46 open and closes a pair of electrical switch contacts 60. Flapper valve 46 thus not only serves as means for venting the gas flow while maintaining the pressure within the chamber at a level above the atmospheric pressure, but also serves as means for indicating and signaling gas flow and pressure above a threshold level. In one working prototype this threshold level was set at a pressure of three inches of water with good results. Should the breath flow be interrupted, the pressure in chamber 42 falls below this threshold level causing the spring 47 to, at least partially, close the valve 46 and separate the contacts 60. In this embodiment valve 46 serves as means for sensing the flow of gas through input unit 21. Those skilled in the art will appreciate that other sensors, such as a Venturi flowmeter or a hot wire anemometer, could be used as a flow sensor.

The operation and interrelation of the various parts of the controller 40 may be better understood by reference to the views of controller 40 shown in FIGS. 3 and 4. FIG. 3 depicts controller 40 in use, as at the start of the testing of a subject, with a gas flow and pressure communicated from tube 24; this pressure is above the flapper value's threshold level. This pressure moves the stopper 46S of the valve 46, opening port 44 and closing the contact set 60. The closure of the contacts 60 completes a circuit to the solenoid 58 and raises the plunger 56. When this occurs gas also flows from the chamber 42, through orifice 48 and chamber 50, to the output port 54.

The closing of the contacts 60 is signaled over line 82 (FIG. 1) to start the timer 62. If this signal is uninterrupted for a predetermined period, the timer provides a control signal over line 88 to de-energize the solenoid 58 and lower plunger 56, as shown in FIG. 4. However, if the gas flow is interrupted sufficiently to allow the contact set 60 to open before the predetermined period elapses, the timer is reset. If closed again, the contact set 60 must remain closed for a new interval of time equal to that predetermined period. The gas sample present in the detector 70 at the end of the predetermined period of, for example, five seconds of uninterrupted blowing, is designed to be essentially deep lung breath. From such a sample an accurate reading of blood alcohol level may be inferred, as is well known in the art. In one actual embodiment this period of five seconds was employed with good results, although for different embodiments with different resistances to breath flow, periods varying from two to eight seconds may be advantageously employed.

Thus, the controller 40 defeats any attempt of an unsupervised or ineffectively supervised subject to prevent an accurate test of deep lung breath by expelling, for a short period, oral and bronchial breath, stopping and inhaling fresh air, and then exhaling this fresh oral and bronchial breath into the input unit 21, and repeating the process over and over again. It should be noted that, unlike some prior art testers, such as the balloon and bag types, closing off input portion 30 of input unit 21 between short blowing periods will not defeat the controller 40.

The controller 40 and breath input unit 21 are provided with a series of heaters and temperature sensors. Thus, as shown in FIG. 2, a spiral heater coil 64 is wound about the inner surface and along the length of the passageway 24P of the input unit 21. A thermistor 67 is mounted adjacent coil 64 for sensing and controlling its temperature. A thermostatic temperature sensitive switch 66 is positioned adjacent the outer surface of body 41 of controller 40, for sensing the temperature of the controller's environment. A cartridge heater 68 is positioned to extend within the chamber 42 of the controller 40. Thermistor 67 and thermostat 66 are both temperature sensors, respectively controlling the heaters 64 and 68 to prevent condensation in the input unit 21 or controller 40. This preserves the integrity of the gas sample that eventually enters the detector 70.

As shown in FIG. 2, the detector 70 includes a chamber 72 preferably formed by a glass envelope 71. The chamber 72 is in communication with the controller through a tube segment 73 that opens into the input port 54. Envelope 71 defines a series of small openings 74 at the bottom of chamber 72, and the top of chamber 72 is open to the atmosphere through a main exit orifice 76. The detector 70, after use, vents gas samples primarily through the upward facing opening 76 by convection as fresh air enters mainly through the small holes 74. The relative sizes of these openings 74 are such as to not interfere with the breath test, but to provide sufficient circulation to purge the chamber.

Within the detector chamber 72 are positioned a catalyst resistance element 78 and a non-catalytic but otherwise identical resistance element 79. These elements 78, 79 are preferably, as shown, respectively a catalytic coated ceramic bead containing a resistance wire, and a non-catalytic coated identical bead. The beads are connected at a junction 80, and form adjacent legs of Wheatstone bridge 69.

Bridge 69, with elements 78, 79 and its other components, is shown in FIG. 1. Opposite elements 78 79 are two additional elements 93, 91 shown as simple resistances. A resistor 92 is coupled between the resistors 91 and 93, and a potentiometer 94 is connected across resistor 92. The bridge is energized from the terminal designated. B+ over adjustable resistor 96 to the common connection between elements 78, 93. The energizing circuit is completed from the common connection between elements 79 and 91, over the effective portion of adjustable resistor 95, to ground. After energization, the position of the movable arm of potentiometer 94 is adjusted such that initially there is no net voltage, or no information signal, between the output conductors 100, 102 of bridge 69.

Before the subject is tested, ordinary air from the atmosphere is present in chamber 72 of alcohol detector 70. The system is energized, as will be explained in more detail in connection with FIG. 5, and the first signal provided between conductors 100, 102 is passed over amplifier 101 to conductor 87. Contact set K3A is closed, charging capacitor 111 to the potential difference between conductor 87 and ground. The negative primary input connection and the primary output connection of operational amplifier 109 are coupled together, and this connection is extended over conductor 112 to one input connection over output apparatus 90. Thus after switch K3A is opened, signal storage means 111 maintains this first signal or reference signal on the positive primary input connection of op amp 109. Those skilled in the art will appreciate that the illustrated circuit, including signal storage means 111 and an operational amplifier 109, need not be employed. Instead meter 121 in the output apparatus can be zeroed manually, eliminating the circuitry of unit 107, without departing from the broader aspects of the invention. Because it is well within the ordinary skill of this art to provide and connect operational amplifiers such as 101 and 109 to achieve the described operation, circuit details are not set out herein.

The system including the signal storage reference unit is the subject of a copending United States patent application, Ser. No. 181,805, entitled, "Breath Tester Null Memory System," filed Sept. 20, 1971 in the names of Joseph P. Hoppesch, Donald H. Ward and James R. Tomashek and is assigned to the same assignee as is the present patent application.

The detector is operated as just described for a period sufficient for the signal on line 87 to return virtually to zero. After the meter 121 is zeroed, switch K3A is opened. The subject under test is then requested to grasp handle portion 26 of breath input unit 21, and blow into the input unit. The breath passes through channel 24P, through controller 40 and into chamber 72 of the detector. As the blowing starts, stopper 46S is displaced downwardly, as shown in FIGS. 3 and 4, closing contact set 60. Closure of this contact set provides a set signal over line 82 to initiate operation of a blowing, or gas delivery, timer 62. Timer 62 provides a control signal over output line 88 to flow control unit 56. As explained in connection with FIGS. 2–4, this signal energizes the winding of solenoid 58 which raises valve 56 upwardly, allowing gas to pass from chamber 42 through channel 48, past the valve 56, and through channel 54 into the detector portion of evaluator 85. As this gas transfer or breath delivery is occuring, represented by the arrows in FIG. 3, the downwardly curving arrows indicate some of the breath is being dumped or vented through exit port 44 to the atmosphere. This venting is represented by arrow 83 in FIG. 1.

At the expiration of a predetermined period, such as five seconds, timer 62 removes the control signal from line 88 and valve 56 is closed (FIG. 4). At this time, in accordance with the operation of other components as will be explained in connection with FIG. 5, an information signal is provided from the breath or gas sample passed over elements 79 and 78. The sample is then vented through the neck of the alcohol detector, as represented by arrow 86 in FIG. 1. It is important to emphasize that the gas sample passed into the detector is directed over both the elements 78 and 79. This affords compensation for different thermal conductivities due to different constituents of the gas sample supplied to the detector. The gas sample passes over the heated catalytic element 78, at which location any alcohol present is oxidized. The heat of this oxidation reaction raises the temperature of element 78, with a consequent increase in resistance of this element. At the same time there is no oxidation reaction adjacent the non-catalytic element 79, and no heat release to change its effective resistance. Thus the change in resistance of element 78, as element 79 remains virtually unchanged, results in a change of the bridge output signal between terminal 80 and conductor 102. This signal is applied, over lines 100 and 102, to the op amp 101 as an information signal denoting the alcohol concentration in the tested gas sample.

Detector 70 has been described as a catalytic combustion detector. Such a detector has been found effective with the system, and at this time is the preferred detector to utilize with the system of FIG. 1. Those skilled in the art will appreciate that other types of detectors, such as ionization type, chemiluminescence type, and electrochemical type, can be utilized for detector 70 without departing from the broader aspects of the invention.

The information signal is passed through op amp 101 and over conductor 87 to the upper input connection of output apparatus 90. Thus meter 121 displays a value indicating the alcohol concentration in the tested gas sample, with respect to an atmospheric air sample from the prior test utilized to establish the reference signal on line 112. Meter 121 can be of the well known peak reading type, which has a needle that is deflected to register the maximum value on line 87, and maintain a display of this value for a short period (such as 10 seconds). Other output apparatus may be employed. A recorder unit can be used to give a permanent record of the information signal level. Alternatively, the output apparatus can be a simple bulb connected to be energized when the information signal on line 87 is above—or at a predetermined level above—the signal on reference conductor 112. With this general perspective of system operation, a more detailed circuit will now be described in connection with FIG. 5.

Figure 5:
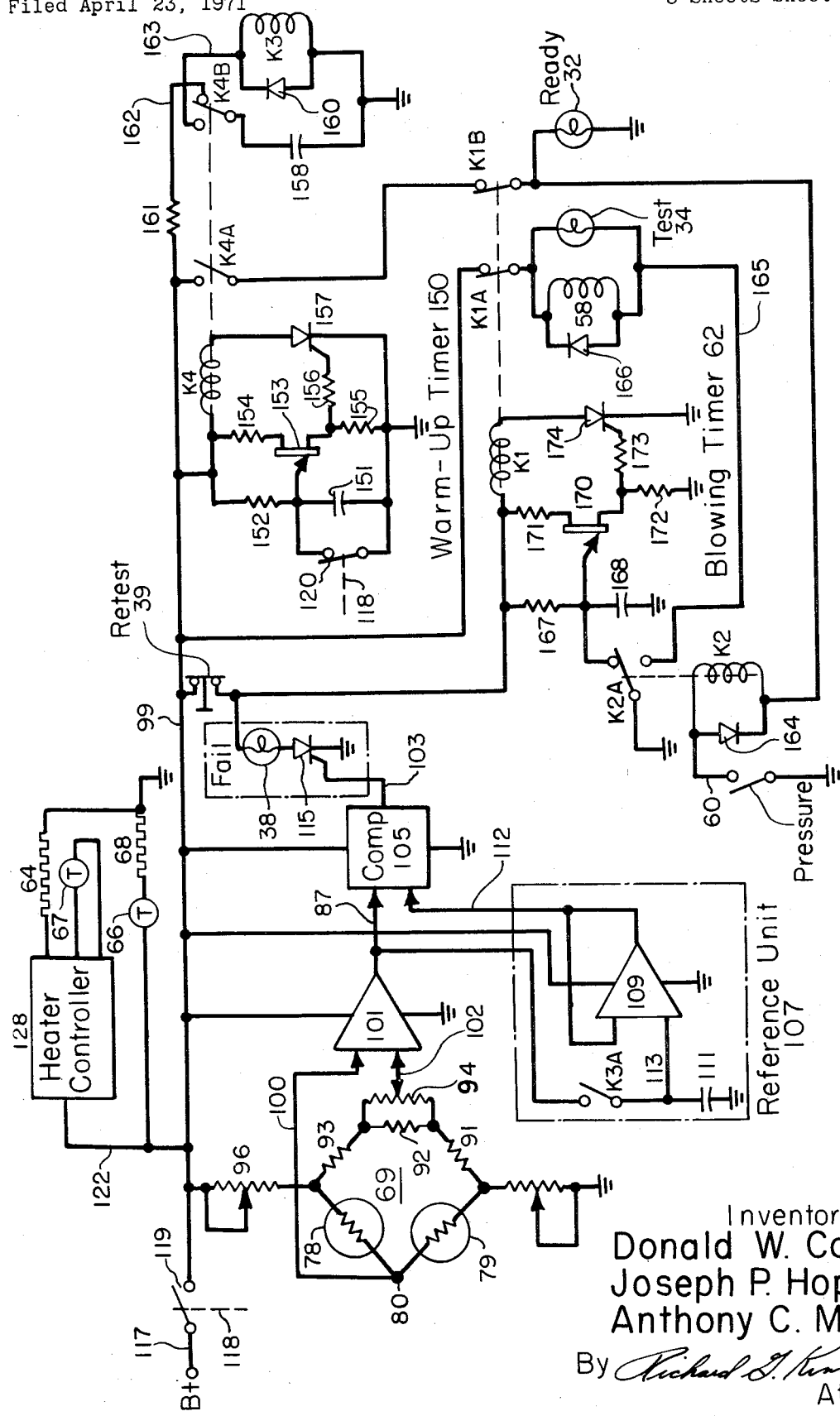
FIG. 5 is a schematic diagram setting forth details of circuit components for implementing the invention.

In FIG. 5, the test circuits including bridge 69, op amp 101, and reference unit 107 are the same as shown in FIG. 1. In FIG. 5 these circuits are energized as switch 119 is closed to extend B+ potential from input line 117, over contact set 119 to energizing conductor 99. Thus an information signal is provided on conductor 87, and the reference signal on line 112. However the output apparatus actuated by these signals is different in FIG. 5.

In this circuit the output apparatus includes a comparator circuit 105, a semiconductor switch 115, and "fail" lamp 38. With optional retest switch 39 in its normally closed position as shown, closure of switch 119 extends B+ voltage over conductor 99, switch 39 and fail lamp 38 to one side of switch 115, shown as an SCR. When comparator circuit 105 detects that the level of the information signal on line 87 exceeds (or exceeds by a pre-established amount) the level of the reference signal on line 112, then circuit 105 provides a turn-on signal over line 103 to turn on SCR 115. This closes the switch 115 to complete the circuit which energizes fail lamp 38. Thus this arrangement provides a positive "fail" indication for use to test whether or not a subject is at or above a certain level of intoxication.

Examples of such use are in police applications, to determine if a subject is legally intoxicated, and in industrial plants to determine if a workman is too intoxicated to perform his assigned tasks.

All the relay switches in FIG. 5 are shown in their unenergized positions. That is, if they are normally open or normally closed, they are depicted as open or closed. The apparatus is energized by closing switch 119 and, over the ganged connection represented by broken line 118, opening contact set 120. This action extends the B+ voltage over line 99 to components including blowing timer 62, warm-up timer 150, and the already-described circuits. It is noted that prior to the taking of the test by a subject, certain components must be energized and stabilized. As previously described, a reference signal is developed from an air sample and stored on a capacitor 111 which forms part of an optional zeroing unit.

Thus, the test start switch 119 when closed supplies energizing potential over line 99 to the various components. Closing of switch 119 supplies power over a line 122 to a heater controller 128, which controls the activation of heater 64 in response to temperature sensor 67. The heater 68 is controlled by the thermostat 66 from voltage also supplied over the line 122.

The timer 150 operates for a warm-up period, for example, 6 minutes, predetermined to be sufficient to raise the components' temperatures, and especially that of detector 70, to operating level. Depending upon the stability requirements of the components selected, this period may be varied over a range from a few seconds to about ten minutes. The warm-up starts as contact set 120 is opened, removing the short circuit from capacitor 151. This capacitor begins to charge over a circuit including a resistor 152. The timer 150 also includes a unijunction transistor 153, fired when capacitor 151, connected between ground and the emitter of transistor 153, is charged to a preset level. The unijunction transistor has its bias level established by resistors 154 and 155. Resistor 154 is coupled between its base 2 connection and B+ on conductor 99. The base 1 connection is coupled over resistor 155 to ground. When fired the transistor 153 provides a signal over resistor 156 to the gate of an SCR 157.

Before SCR 157 is gated on, relay winding K4 is de-energized, contact set K4A is open, and contact set K4B completes a charging circuit for capacitor 158. Current flows from conductor 99 over resistor 161, conductor 162, contact set K4B, and capacitor 158 to ground. Thus capacitor 158 is charged at this time. As SCR 157 conducts, an obvious energizing circuit for relay winding K4 is completed. This relay operates, and at its contact set K4A prepares an energizing circuit for relay winding K2; this preparation is signalled by energization of "ready" lamp 32. Relay winding K2 will be energized subsequently as contact set 60 is closed by gas flow. In the operation of relay K4, contact set K4B is displaced to complete a circuit which allows capacitor 158 to discharge through relay winding K3. This discharge of capacitor 158 momentarily energizes relay K3, closing contact set K3A. This completes a circuit between conductor 87 and capacitor 111, to store the reference signal on this capacitor. As mentioned before, this is the amplified output of the signal developed from the air sample in the detector 70 prior to sampling of breath.

As the subject blows into input unit 21, contact set 60 is closed, and relay K2 is energized. Relay K2 operates and closes contact set K2A, which (1) starts blowing timer 62, grounds the line 165 to (2) light the "test" light 34 and (3) operate the solenoid 58 to open valve 56. The solenoid winding and test lamp are connected to the B+ line 99 through a normally closed relay switch K1A. The solenoid 58 has a safety diode 166 connected across it.

The timer 62 is structurally the same as the other timer 150, differing only by the values of the resistance and capacitance in its timing circuit. That is, blowing timer 62 includes a timing resistor 167 which feeds current from B+ line 99 to a charging capacitor 168. The capacitor 168 is connected to the emitter of a unijunction transistor 170 which is operationally biased by resistors 171 and 172. The base 2 connection of transistor 170 is coupled over resistor 171 and switch 39 to conductor 99. The base 1 connection is coupled over resistor 172 to ground. Base 1 of the unijunction transistor 170 is also coupled over a resistor 173 to the gate of an SCR 174. This SCR, when conducting, grounds one end of relay coil K1, whose other end is connected over re-test switch 39 to the line 99.

It should be noted that the solenoid-actuated valve 56 is closed during the warm-up period and remains closed until the breath pressure switch 60 is closed. This apparatus is designed to insure that air is tested at the end of the warm-up period. Although it might at first appear that the subject, by blowing before ready light 32 is on, may cause an erroneous "reference" to be taken because coil K4 closes both the switches K4A and K4B at the same time, the operating time of the relay K2 may be chosen to be slow compared to the operating and release times of coil K3 to prevent this. The solenoid 58 may also be made slow acting to overcome this problem.

At the end of a short time period (e.g. 5 seconds) of continuous breath flow, the timer 62 gates on transistor 170, turning on SCR 174 and energizing relay winding K1. This relay operates, opening contact sets K1A and K1B. Opening of contact set K1A deenergizes both solenoid 58 and test lamp 34. Opening of contact set K1B interrupts the energizing circuit for both winding K2, which releases, and ready lamp 32, which is deenergized. Thus the subject can be instructed to "blow out the ready lamp," which will not be extinguished until the end of the predetermined period as set by operation of timer 62.

The closure of the valve 56 stops the flow of breath through the detector 70. If the output of the detector 70, amplified by the amplifier 101, reaches the preselected alcohol concentration level, the comparator 105 produces the output "fail" signal and the SCR 115 is turned on. This lights the "fail" lamp 38. If the light is not illuminated in a short period (e.g. 5 seconds), the subject has passed the test. In this case, another subject may take the test or the system can be shut down by opening the switch 119.

Should a subject fail the test, light 38 will be energized. To retest the same subject or to test a new subject, retest button 39 may be pushed, disconnecting the light 38 and allowing the SCR's to return to their non-conducting state, provided the output signal on line 87 has fallen below the trip level.

Elements 78 and 79 are commercially available from General Monitors, Inc., in an assembly termed a "Minidetector." The other components in bridge 69, and the other circuit components, are readily available.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. A breath testing apparatus for indicating the breath alcohol concentration of a subject comprising:
   a breath input unit for receiving breath in the form of exhaled gas from a subject;
   means for sensing the flow of gas through said input unit;
   an evaluator connected to receive a sample of the gas flowing through the input unit, for evaluating the alcohol concentration in the received gas sample, and for producing an output signal in response to the detected alcohol concentration;
   an output apparatus connected for operation in response to receipt of the output signal from said evaluator; and
   means, operative in response to said flow sensing means, for producing a control signal in response to a predetermined continuous and uninterrupted flow of breath over a threshold level.

2. The breath testing apparatus defined in claim 1, in which said output apparatus includes a meter for indicating the amplitude of the output signal received from the evaluator.

3. The breath testing apparatus defined in claim 1, in which the output apparatus includes means for indicating when the output signal received from the evaluator exceeds a predetermined level.

4. A breath testing apparatus for indicating the breath alcohol concentration of a subject comprising:
   a breath input unit for receiving breath in the form of exhaled gas from a subject;
   means for sensing the flow of gas through said input unit;
   an evaluator connected to receive a sample of the gas flowing through the input unit, for evaluating the alcohol concentration in the received gas sample, and for producing an output signal in response to the detected alcohol concentration;
   an output apparatus connected for operation in response to receipt of the output signal from said evaluator;
   a timer that produces a control signal after a predetermined period of time, which timer is started by said flow sensing means sensing a gas flow above a threshold level, and is reset if said flowing sensing means senses a gas flow below said threshold level; and
   means, operative in response to receipt of the timer control signal, to signify the gas flow has been maintained above the threshold level for the predetermined period of time.

5. A breath testing apparatus for indicating the breath alcohol concentration of a subject comprising:
   a breath input unit for receiving breath in the form of exhaled gas from a subject;
   means for sensing the flow of gas through said input unit;
   an evaluator connected to receive a sample of the gas flowing through the input unit, for evaluating the alcohol concentration in the received gas sample, and for producing an output signal in response to the detected alcohol concentration;
   an output apparatus connected for operation in response to receipt of the output signal from said evaluator;
   a timer that produces a control signal after a predetermined period of time, which timer is set by said flow sensing means sensing a gas flow above a threshold level, and is reset if said flow sensing means senses a gas flow below said threshold level; and
   means, including a valve operative in response to receipt of the timer control signal, to govern the gas flow from the breath input unit to the evaluator.

6. A breath testing apparatus for indicating the deep lung breath alcohol concentration of a subject comprising:
   a breath input unit for receiving a gas sample;
   means, coupled to the breath input unit, for providing a flow-indicating signal so long as the gas flow through the breath input unit is above a threshold level;
   an alcohol detector, connected to evaluate the alcohol concentration in gas received from the breath input unit, and to produce an information signal in response to the detected alcohol concentration;
   means for directing gas from the breath input unit to the alcohol detector;
   an ouput unit connected for operation in response to receipt of the detector information signal; and
   timing means, operative in response to receipt of the flow-indicating signal, for providing a control signal only after the flow-indicating signal has been continuously present for a predetermined time period, so that a subject blowing breath continuously over the threshold level for the predetermined time period will provide a deep lung breath sample for testing in the alcohol detector at the time the control signal is provided by the timing means.

7. The breath testing apparatus defined in claim 6, in which said output unit includes a meter for indicating the amplitude of the information signal received from the detector.

8. The breath testing apparatus defined in claim 6, in which the output unit includes means for indicating when the information signal received from the detector exceeds a predetermined level.

9. A breath testing apparatus for indicating the deep lung breath alcohol concentration of a subject, comprising:
   a breath input unit for receiving a gas sample;
   means, coupled to the breath input unit, for providing a flow-indicating signal so long as the gas flow through the breath input unit is above a threshold level;
   an alcohol detector, connected to evaluate the alcohol concentration in gas received from the breath input unit, and to produce an information signal in response to the detected alcohol concentration;

means for directing gas from the breath input unit to the alcohol detector;

an output unit connected for operation in response to receipt of the detector information signal;

timing means, operative in response to receipt of the flow-indicating signal, for providing a control signal only after the flow-indicating signal has been continuously present for a predetermined time period, so that a subject blowing breath continuously over the threshold level for the predetermined time period will provide a deep lung breath sample for testing in the alcohol detector at the time the control signal is provided by the timing means, in which said timing means is started when said flow-indicating signal is initially provided, and is reset if said flow-indicating signal is removed; and means operative in response to receipt of the control signal from the timing means, to signify the gas flow has been maintained above the threshold level for the predetermined period of time.

10. A breath testing apparatus for indicating the breath alcohol concentration of a subject, comprising:

a breath input unit for receiving a sample of breath in the form of a gas;

means, coupled to the breath input unit, for providing a flow-indicating signal so long as the gas flow through the breath input unit is above a threshold level;

an alcohol detector, connected to evaluate the alcohol concentration in gas received from the breath input unit, and to produce an information signal in response to the detected alcohol concentration;

means for directing gas from the breath input unit to the alcohol detector;

an output unit connected for operation in response to receipt of the detector information signal;

timing means, operative in response to receipt of the flow-indicating signal, for providing a control signal only after the flow-indicating signal has been continuously present for a predetermined time period, so that a subject blowing breath continuously over the threshold level for the predetermined time period will provide a breath sample for testing in the alcohol detector at the time the control signal is provided by the timing means; and said timing means being started when said flow-indicating signal is initially provided, and being reset if said flow-indicating signal is removed.

11. An improved breath testing unit comprising:

input means for receiving breath supplied to said unit;

evaluator means adapted to receive breath supplied to the input means to produce an output signal determined by the alcohol content of the breath, means responsive to said output signal to provide an output function, and signaling means, responsive to breath supplied to said input means, operative only in response to a predetermined, uninterrupted and continuous flow of breath from said input means to signal that a desired breath sample has been supplied to the unit.

12. A breath testing apparatus for indicating the deep lung breath alcohol concentration of a subject, comprising:

a breath input unit for receiving a gas sample;

means, coupled to the breath input unit, for providing a flow-indicating signal so long as the gas flow through the breath input unit is above a threshold level;

an alcohol detector, connected to evaluate the alcohol concentration in gas received from the breath input unit, and to produce an information signal in response to the detected alcohol concentration;

means for directing gas from the breath input unit to the alcohol detector;

an output unit connected for operation in response to receipt of the detector information signal; and timing means, operative in response to receipt of the flow-indicating signal, for providing a control signal only after the flow-indicating signal has been continuously present for a predetermined time period, which timing means is started when said flow-indicating signal is initially provided and is reset if said flow-indicating signal is removed, so that a subject blowing breath continuously over the threshold level for the predetermined time period will provide a deep lung breath sample for testing in the alcohol detector at the time the control signal is provided by the timing means.

References Cited
UNITED STATES PATENTS
3,607,095  9/1971  Etzlinger ........ 23—255 RX MORRIS O. WOLK, Primary Examiner
R. M. REESE, Assistant Examiner U.S. Cl. X.R.
73—421.5; 128—2 C